United States Patent
Barbat et al.

(10) Patent No.: US 8,967,701 B2
(45) Date of Patent: Mar. 3, 2015

(54) INTEGRATED SHOTGUN RAIL DEFLECTOR

(71) Applicant: Ford Global Technologies, LLC, Dearborn, MI (US)

(72) Inventors: Saeed David Barbat, Novi, MI (US); Mohamed Ridha Baccouche, Ann Arbor, MI (US); Rahul Arora, Royal Oak, MI (US); Saied Nusier, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 13/782,455

(22) Filed: Mar. 1, 2013

(65) Prior Publication Data

US 2014/0246880 A1   Sep. 4, 2014

(51) Int. Cl.
*B62D 21/15* (2006.01)
(52) U.S. Cl.
CPC .................................... *B62D 21/152* (2013.01)
USPC .................................. 296/187.1; 296/203.02
(58) Field of Classification Search
USPC ................. 296/187.1, 187.3, 187.09, 193.09, 296/203.02
See application file for complete search history.

(56) References Cited

U.S. PATENT DOCUMENTS

| | | | |
|---|---|---|---|
| 6,769,733 B2 | 8/2004 | Seksaria et al. | |
| 7,210,733 B2 * | 5/2007 | Mouch et al. | 296/203.02 |
| 7,296,824 B2 * | 11/2007 | Yasui et al. | 280/784 |
| 8,152,224 B2 | 4/2012 | Faruque et al. | |
| 2003/0205916 A1 | 11/2003 | Seksaria et al. | |
| 2007/0176443 A1 * | 8/2007 | Yasuhara et al. | 293/133 |
| 2011/0148151 A1 * | 6/2011 | Abe et al. | 296/203.02 |
| 2012/0248820 A1 * | 10/2012 | Yasui et al. | 296/187.09 |

\* cited by examiner

*Primary Examiner* — Jason S Morrow
*Assistant Examiner* — E Turner Hicks
(74) *Attorney, Agent, or Firm* — Raymond L. Coppiellie; Brooks Kushman P.C.

(57) ABSTRACT

A shotgun rail, or deflector, is provided as part of a front end structure of a vehicle. The shotgun rail includes a triangular shaped bulkhead having a front surface disposed at an oblique angle relative to the front of a vehicle and a rear surface that is disposed at an oblique angle relative to the rear of the vehicle. A laterally facing surface of the bulkhead is attached to a frame rail. Loads resulting from an impact with a small offset rigid barrier are distributed between longitudinal load paths and lateral load paths through the shotgun rails, frame rails, and sub-frame.

17 Claims, 3 Drawing Sheets

INTEGRATED SHOTGUN RAIL DEFLECTOR

TECHNICAL FIELD

This disclosure relates to land vehicle structural rails for deflecting the vehicle away from a small offset rigid barrier upon impact.

BACKGROUND

Land vehicles are tested for crashworthiness by a variety of tests including frontal impacts, side impacts, rear impacts, roll-over and other tests. Frontal impact tests were previously developed that specified that a vehicle impacts a barrier between the frame rails that extend longitudinally relative to the vehicle. In this type of test, the frame rails provided the primary support for the vehicle body. The extent of any intrusions into the passenger compartment are measured at the brake pedal, foot rest, left toe pan, center toe pan, right toe pan, left instrument panel, right instrument panel, and door.

A new test is proposed for simulating small offset frontal crashes against a rigid barrier. In the proposed test, the vehicle impacts a rigid barrier having a six inch pole-like radiused corner with a 25% overlap at 40 MPH. The impact is outboard of the frame rails and the frame rails do not provide as much resistance to intrusion into the passenger compartment as in the case of impacts between the frame rails.

The weight of land vehicles is being reduced to substantially improve fuel efficiency. Vehicles are currently being designed to reduce the weight of the vehicle with an objective of not compromising performance or crashworthiness. It is difficult to meet the proposed test requirements for the small offset rigid barrier crash test while reducing vehicle weight and reducing manufacturing costs.

Reducing the cost of vehicles is a continuing goal in vehicle design. One way to reduce the cost of a vehicle is to reduce the number of parts used to manufacture a vehicle. Some structural rails are fabricated in multiple pieces and may be complicated to fabricate and assemble. Multi-piece structural rails are also subject to issues relating to the integrity of the welds between parts. Each weld must be carefully performed and monitored for quality control. Another way to reduce costs is to reduce the weight of parts that can result in reduced material costs.

This disclosure is directed to solving the above problems and other problems as summarized below.

SUMMARY

According to one aspect of this disclosure, a deflector is disclosed for a vehicle having a frame and a hinge pillar on each side of the vehicle and a sub-frame for supporting an engine. The deflector comprises a rail attached to the hinge pillar, the frame and sub-frame. The rail includes a bulkhead having a front surface that is disposed at an oblique angle relative to the front of the vehicle, and a curved intermediate portion extending from the bulkhead to the hinge pillar.

According to another aspect of this disclosure as it relates to the deflector, the bulkhead may be disposed at a forward end of the rail that is welded to a laterally facing surface of the frame and is assembled with a fastener assembly to the sub-frame.

According to further aspects of this disclosure as it relates to the deflector, a first longitudinal load path for laterally offset frontal impacts may be provided from the bulkhead through the rail to the hinge pillar and a second longitudinal load path is provided from the bulkhead through the frame to the hinge pillar. The first longitudinal load path for a frontal impact is provided through the frame and the rail that are connected at a location in front of the hinge pillar. The deflector distributes the load of the frontal impact with a small offset rigid barrier between the frame and the rail. A lateral load path for frontal impacts is provided through the bulkhead, the frame and the sub-frame that inhibits lateral compression of the vehicle and causes the vehicle to be deflected laterally to glance off of a small offset rigid barrier.

The rail may be an integral member with the bulkhead having a hollow triangular cross-section in a horizontal plane, and an intermediate portion that is tubular in shape. The deflector may further comprise a weld flange formed at an opposite end of the intermediate portion from the bulkhead that is welded to the hinge pillar. The bulkhead may include a lateral surface that is welded in a face-to-face relationship to the frame. The bulkhead also has a rear surface that is disposed at an oblique angle relative to the rear of the vehicle. The tubular intermediate portion is convex, but during a small offset rigid barrier test the curved intermediate portion is partially deformed into a concave shape as the rail progressively collapses towards the frame during the test.

According to another aspect of this disclosure, a front end structure for a vehicle body is disclosed that comprises a pair of frame rails and a sub-frame disposed between the frame rails. Each of a pair of hinge pillars extends above a rocker assembly and are fixedly attached to one of the frame rails. Each of a pair of shotgun rails are attached to one of the hinge pillars at a spaced location above the rocker assembly. Each shotgun rail is attached to one of the frame rails and the sub-frame by a bulkhead located in front of one of the hinge pillars.

According to other aspects of this disclosure as it relates to a front end structure, the shotgun rails may comprise a bulkhead that is triangular in horizontal cross-section. The bulkhead may further include a surface that is welded in a face-to-face relationship with a wall of the frame. A deflection surface may be formed on each of the bulkheads that is oriented at an oblique angle in the forward longitudinal direction. A curved intermediate portion and a rear portion may be attached to the front hinge pillar.

The front end structure defines a first longitudinal load path for laterally offset frontal impacts to the bulkhead. The first longitudinal load path extends through the shotgun rail to the hinge pillar. A second longitudinal load path is provided from the bulkhead through the frame rail to the hinge pillar. During a small offset rigid barrier test the bulkhead and the shotgun rail cause the front end structure to be deflected in a glancing impact.

The front end structure also defines a lateral load path from the bulkhead laterally across a first one of the frame rails, across the sub-frame, and to a second one of the frame rails. During a small offset rigid barrier test, a portion of a force applied to the bulkhead is redirected by the bulkhead to the lateral load path and also causes the front end structure to be deflected in a glancing impact.

According to additional aspects of this disclosure, the front end structure may further comprise a curved intermediate portion that bows laterally outwardly from the bulkhead to one of the hinge pillars. During a small offset rigid barrier test, the curved intermediate portion progressively collapses towards one of the frame rails as the front end structure moves into the barrier. Expressed in another way, the front end structure may further comprise a curved intermediate portion that is convex in the transverse or lateral direction. The curved intermediate portion is partially deformed into a laterally concave shape with the shotgun rail collapsing progressively towards one of the frame rails as the front end structure moves into the barrier.

The above aspects of this disclosure and other aspects will be described in greater detail below with reference to the attached drawings in the following detailed description.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
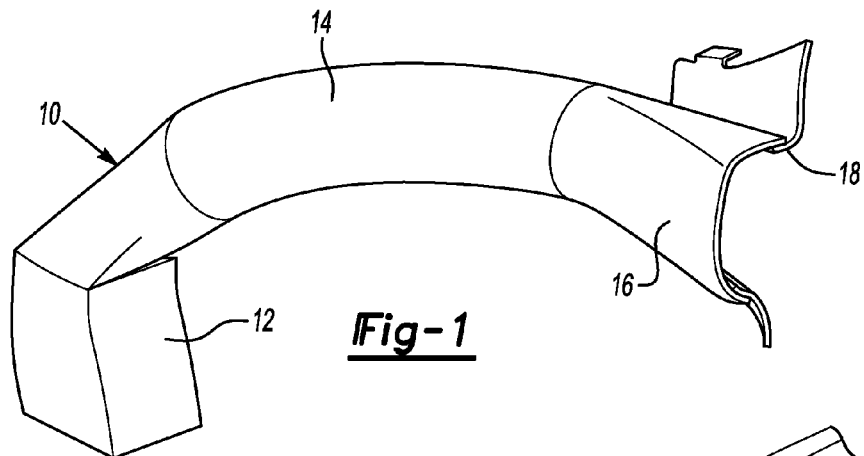
FIG. 1 is a perspective view of a shotgun rail for a vehicle shown attached to a fragment of a front hinge pillar.

Referring to FIG. 1, a shotgun rail 10, or deflector, is illustrated that is designed to improve the crash worthiness of a vehicle in a small offset rigid barrier test while also reducing vehicle weight and part count. The shotgun rail 10 includes a bulkhead 12 on its forward end. An intermediate portion 14 is generally convex in shape and extends from the bulkhead 12 to a back end 16 of the shotgun rail 10. The back end 16 of the shotgun rail 10 is secured to a hinge pillar 18 and may be welded to the hinge pillar 18. The illustrated embodiment of the shotgun rail 10 is a hydro-formed aluminum tubular member. The bulkhead 12, intermediate portion 14, and back end 16 are integrally formed in a hydro-forming operation. Alternatively, the bulkhead 12, intermediate portion 14, and back end 16 may be formed from a plurality of stampings that are joined together by spot welding or other conventional forming techniques. The stampings used to form the parts of this alternative design for the shotgun rail may be formed as a plurality of clam shell shaped portions of the part.

Figure 2:
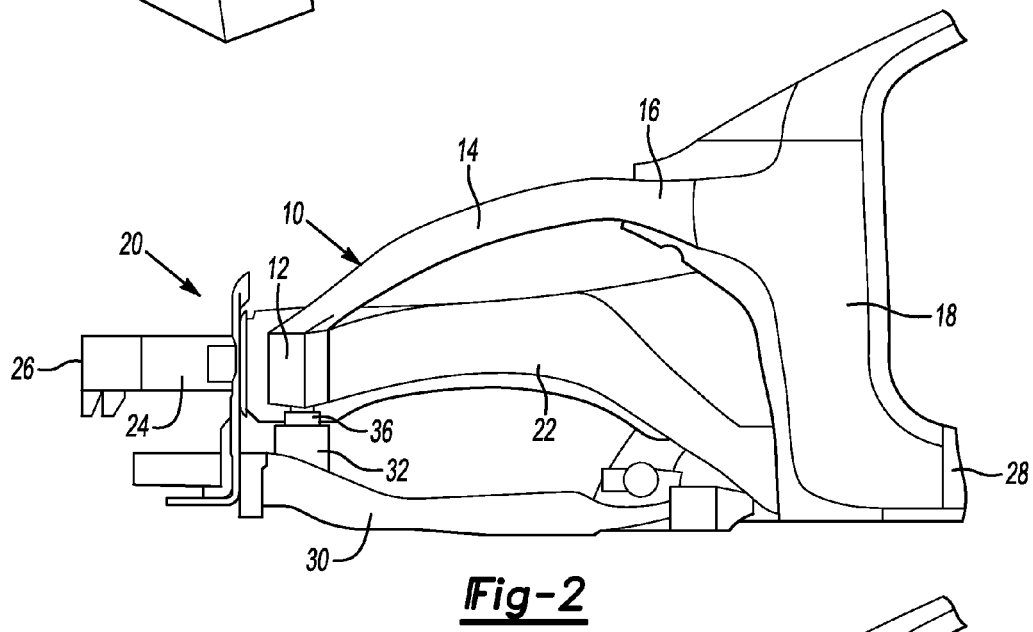
FIG. 2 is a diagrammatic view of the front end of a vehicle including the shotgun rail shown in FIG. 1.

Referring to FIG. 2, a front end structure 20 of the vehicle is illustrated that includes the shotgun rail 10. The shotgun rail 10 includes the bulkhead 12 disposed in front of the intermediate portion 14 that is, in turn, in front of the back end 16 that is connected to the hinge pillar 18. The front end structure 20 also includes a frame rail 22 that extends longitudinally in the vehicle. The frame rail 22 may be an independently formed frame rail or may be an integral frame rail formed as a part of a unibody construction vehicle. A bumper support assembly 24 supports a bumper 26. The bumper support assembly 24 may include crash cans or other components that connect the bumper 26 to the frame rail 22. The frame rail 22 is also connected directly or indirectly to a rocker assembly 28. The rocker assembly 28 extends beneath the vehicle doors. The rocker assembly 28 is directly connected to the hinge pillar 18 at the lower end of the hinge pillar 18.

A sub-frame 30 is provided as part of the front end structure 20. The sub-frame 30 supports the engine (not shown) of the vehicle. A point mobility bracket 32 is provided at a junction of the bulkhead 12 of the shotgun rail 10, the frame rail 22, and sub-frame 30. During automotive assembly, the vehicle and chassis are separately assembled and are joined together by a fastener assembly 36 that secures the sub-frame 30 to the bulkhead 12. The bulkhead 12 is welded to the frame rail 22.

Figure 3:
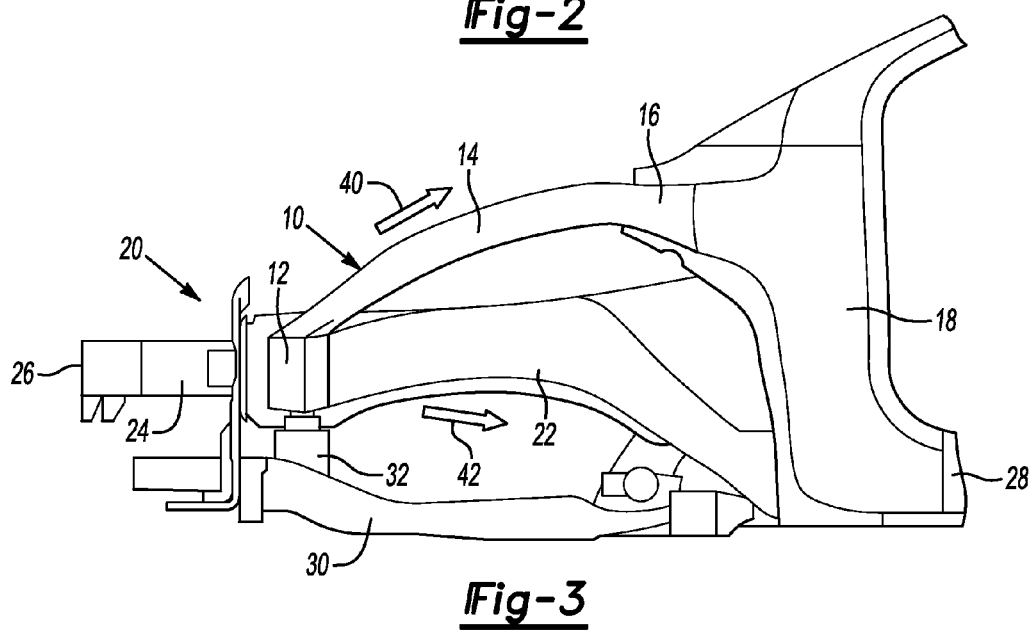
FIG. 3 is a diagrammatic representation of the longitudinal load paths of an impact with a small offset rigid barrier.

Referring to FIG. 3, a diagrammatic representation of the longitudinal load paths for a small offset rigid barrier test are shown to include a shotgun longitudinal load path 40 and a frame rail longitudinal load path 42. When a small offset rigid barrier is contacted, part of the load applied during the impact with the bulkhead 12 of the shotgun rail 10 is directed along the shotgun longitudinal path 40. Another part of the impact forces are directed to the frame rail longitudinal load path 42.

Figure 4:
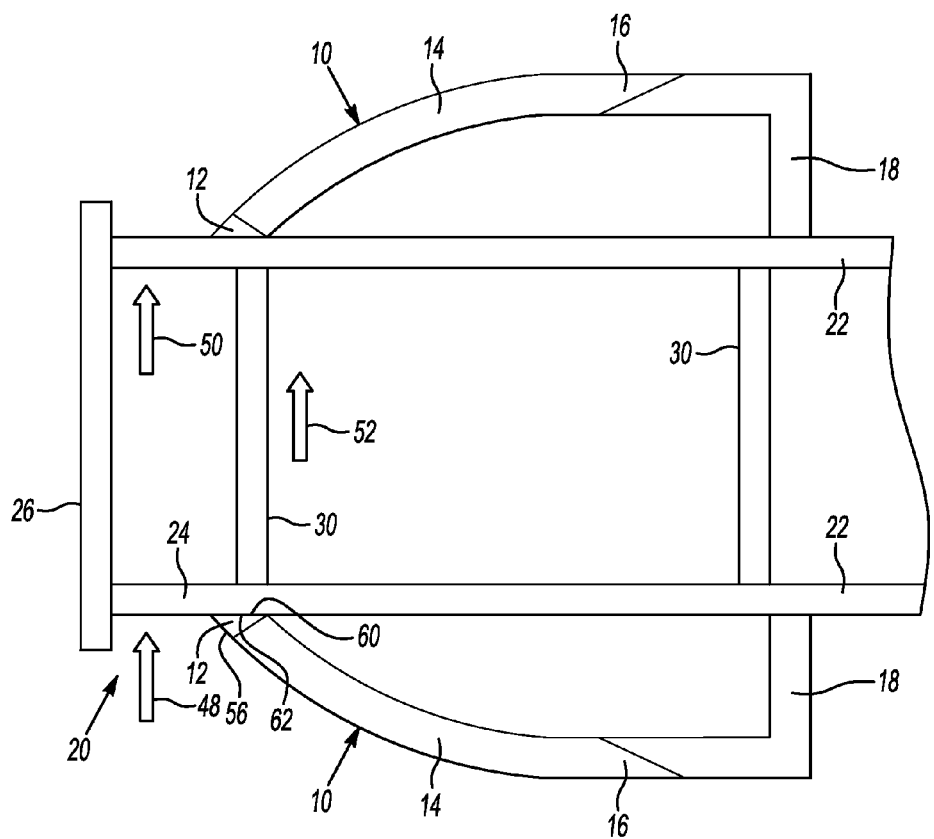
FIG. 4 is a diagrammatic view of the tranverse load paths of an impact with the small offset rigid barrier.

Referring to FIG. 4, a lateral load path is illustrated for a small offset rigid barrier as it impacts the bulkhead 12 of the shotgun rail 10. The bulkhead 12 upon impact directs part of the force of the impact into a first frame rail lateral load path 48. The force of the impact is also directed toward a second frame rail lateral load path 50 and a sub-frame lateral load path 52. The load paths 48, 50, 52 are tranverse to the direction of the vehicle travel and the reaction force moves the vehicle away from the small offset rigid barrier. The bulkhead 12 converts the impact to a glancing blow.

Figure 5:
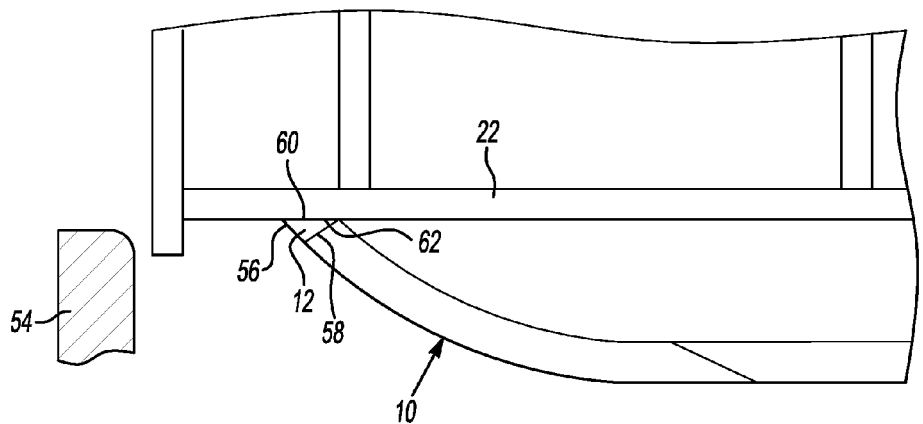
FIG. 5 is a diagrammatic plan view of a portion of a front end of a vehicle just prior to impact by a bulkhead portion of the shotgun rail with small offset rigid barrier.
Figure 6:
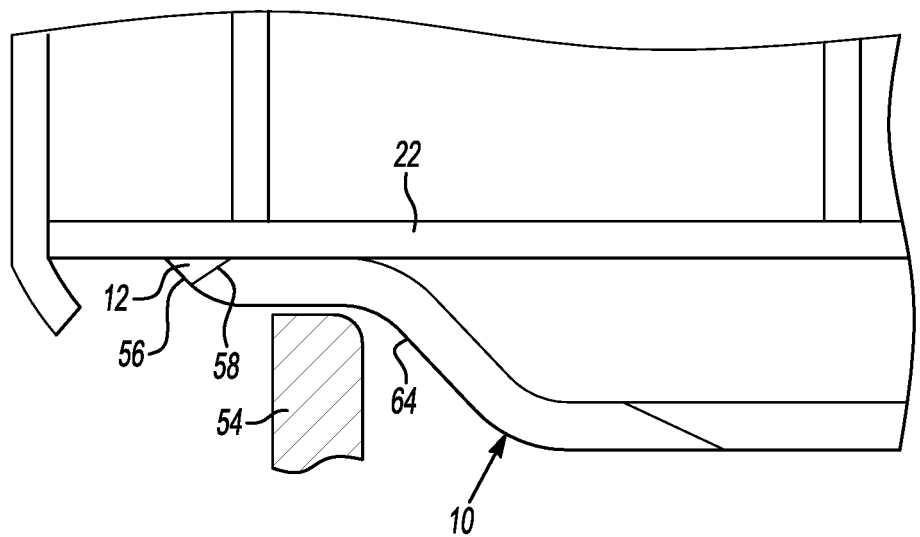
FIG. 6 is a diagrammatic plan view of a portion of a front end of a vehicle during an impact by the shotgun rail with a small offset rigid barrier.
Figure 7:
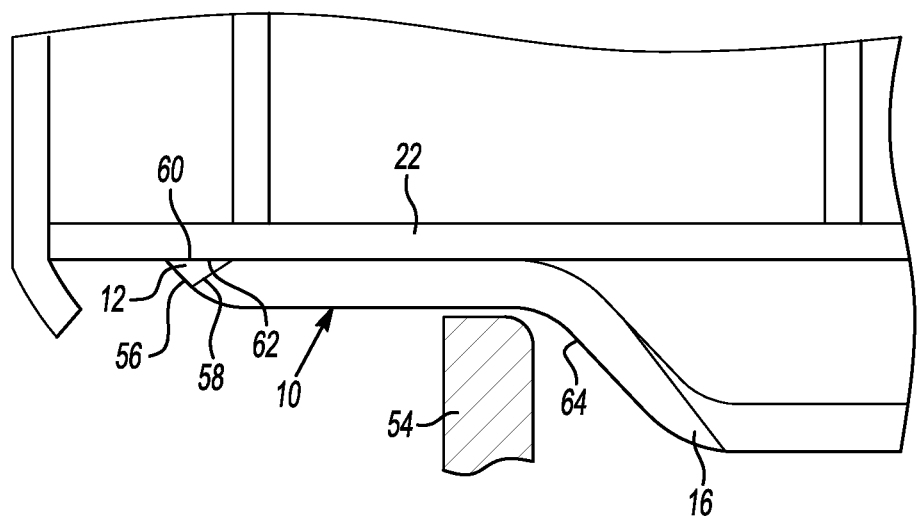
FIG. 7 is a diagrammatic plan view of a portion of a front end of a vehicle during late stages of an impact with a small offset rigid barrier.

Referring to FIGS. 5-7, a series of views of a front end structure 20 are shown during the course of a collision with a small offset rigid barrier 54. The bulkhead 12 has a front surface 56 that is directed toward the front of the vehicle and extends an oblique angle of approximately 135° plus or minus 15° relative to the front of the front end structure 20. A rear surface 58 of the bulkhead 12 extends at an oblique angle relative to the rear of the vehicle at an angle of approximately 135° plus or minus 15°. When the front surface 56 of the bulkhead 12 moves into the small offset rigid barrier 54, the force of impact is channeled between the longitudinal load paths and the lateral load paths. The oblique orientation of the front surface 56 of the bulkhead 12 converts the force of impact into a glancing blow. A laterally facing surface 60 of the bulkhead 12 is attached to a laterally facing surface 62 of the frame rail 22. The bulkhead 12 may be welded to the frame rail 22 with a laterally facing surface 60, 62 in a face-to-face relationship.

Referring to FIG. 5, the small offset rigid barrier 54 is shown just prior to being contacted by the bulkhead 12 of the shotgun rail 10. In the small offset rigid barrier test, the vehicle is driven into the barrier 54 outboard of the frame rail 22 at a speed of 40 miles per hour.

Referring to FIG. 6, the small offset rigid barrier 54 is shown after the barrier 54 has impacted and proceeded past the bulkhead 12. At this point, the barrier 54 is in full engagement with the intermediate portion 14 and is deforming the previously convex intermediate portion 14 to form a concave deformation 64 of the intermediate portion 14. The front end structure 20 of the vehicle continues to move in a forward direction. Resistance provided by the shotgun rail 10 converts the force of impact into a glancing impact.

Referring to FIG. 7, the small offset rigid barrier 54 is shown in a later stage of the impact with the intermediate portion 14 of the shotgun rail 10 collapsed against the frame rail 22. The intermediate portion 14 at this point includes the concave deformation 64 that has moved toward the back end 16 of the shotgun rail 10 as compared to FIG. 6.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A deflector for a vehicle having a frame and hinge pillar on each side of the vehicle, and a sub-frame supporting an engine, the deflector comprising:
   a rail attached to the hinge pillar, the frame and sub-frame, the rail including a bulkhead having an obliquely angled front surface with a hollow triangular cross-section in a horizontal plane, and an integral tubular curved intermediate portion extending from the bulkhead to the hinge pillar.

2. The deflector of claim 1 wherein the bulkhead is disposed at a forward end of the rail that is welded to a laterally facing surface of the frame and is assembled with a fastener assembly to the sub-frame.

3. The deflector of claim 1 wherein longitudinal load paths for a frontal impact are provided through the frame and the rail that divide the load of the frontal impact with a small offset rigid barrier between the frame and the rail.

4. The deflector of claim 1 wherein a lateral load path for frontal impacts is provided through the bulkhead, the frame, and the sub-frame that inhibits lateral compression of the vehicle and causes the vehicle to be deflected laterally to glance off of a small offset rigid barrier.

5. The deflector of claim 1 further comprising a weld flange formed at an opposite end of the intermediate portion from the bulkhead that is welded to the hinge pillar.

6. A deflector for a vehicle having a frame and hinge pillar on each side of the vehicle, and a sub-frame supporting an engine, the deflector comprising:
   a rail attached to the hinge pillar, the frame and sub-frame, the rail including a bulkhead having a front surface that is disposed at an oblique angle relative to the front of the vehicle, and a curved intermediate portion extending from the bulkhead to the hinge pillar wherein the bulkhead is triangular in horizontal cross-section and further includes a laterally facing surface that is welded in a face-to-face relationship to the frame, and a rear surface that is disposed at an oblique angle relative to the rear of the vehicle.

7. The deflector of claim 1 wherein a first longitudinal load path for laterally offset frontal impacts is provided from the bulkhead through the rail to the hinge pillar and a second longitudinal load path is provided from the bulkhead through the frame to the hinge pillar.

8. The deflector of claim 1 further comprising a curved intermediate portion that is laterally convex, and wherein during a small offset rigid barrier test the curved intermediate portion is partially deformed into a laterally concave shape as the rail progressively collapses towards the frame during an impact with the barrier.

9. A front end structure for a vehicle body comprising:
   a pair of frame rails;
   a sub-frame disposed between the frame rails;
   a pair of hinge pillars extending above a rocker assembly that are each fixedly attached to one of the frame rails; and
   a pair of shotgun rails each attached to one of the hinge pillars at a spaced location above the rocker assembly, wherein each shotgun rail is attached to one of the frame rails and the sub-frame by a bulkhead located in front of one of the hinge pillars, wherein the shotgun rails further comprise a bulkhead that is triangular in horizontal cross-section and further includes a surface that is welded in a face-to-face relationship with a wall of the frame.

10. The front end structure of claim 9 further comprising a deflection surface formed on each of the bulkheads that is oriented at an oblique angle relative to a longitudinal direction.

11. The front end structure of claim 9 further comprising a deflection surface formed on each of the bulkheads that is oriented at an oblique angle relative to a longitudinal direction, a curved intermediate portion, and a rear portion that is attached to a front hinge pillar.

12. The front end structure of claim 9 wherein a first longitudinal load path for laterally offset frontal impacts is provided from the bulkhead through the shotgun rail to the hinge pillar and a second longitudinal load path is provided from the bulkhead through the frame rail to the hinge pillar.

13. The front end structure of claim 12 wherein during a small offset rigid barrier test the bulkhead and the shotgun rail cause the front end structure to be deflected in a glancing impact.

14. The front end structure of claim 9 wherein a lateral load path for laterally offset frontal impacts is provided from the bulkhead laterally across a first one of the frame rails, across the sub-frame, and to a second one of the frame rails.

15. The front end structure of claim 14 wherein during a small offset rigid barrier test a portion of a force applied to the bulkhead is redirected by the bulkhead to the lateral load path and causes the front end structure to be deflected in a glancing impact.

16. The front end structure of claim 9 further comprising a curved intermediate portion that bows laterally outwardly from the bulkhead to one of the hinge pillars, and wherein during a small offset rigid barrier test the curved intermediate portion progressively collapses towards one of the frame rails as the front end structure moves into the barrier.

17. The front end structure of claim 9 further comprising a curved intermediate portion that is laterally convex, and wherein during a small offset rigid barrier test the curved intermediate portion is partially deformed into a laterally concave shape with the shotgun rail collapsing progressively towards one of the frame rails as the front end structure moves into the barrier.

* * * * *